United States Patent
Sasaki

(10) Patent No.: US 7,122,134 B2
(45) Date of Patent: Oct. 17, 2006

(54) OPTICAL MEMBERS, COMPOSITIONS, METHODS AND S-CONTAINING COMPOUNDS FOR PRODUCING THEM

(76) Inventor: Hiroki Sasaki, c/o Fuji Phot Film Co., Ltd. 210 Nakanuma, Minami-ashigara-shi, Kanagawa 250-0193 (JP)

(\*) Notice: Subject to any disclaimer, the term of this patent is extended or adjusted under 35 U.S.C. 154(b) by 176 days.

(21) Appl. No.: 10/397,183

(22) Filed: Mar. 27, 2003

(65) Prior Publication Data
US 2003/0218154 A1 Nov. 27, 2003

(30) Foreign Application Priority Data
Mar. 29, 2002 (JP) ............................. 2002-093684

(51) Int. Cl.
*G02B 6/028* (2006.01)
*F21V 9/00* (2006.01)
*B29D 11/00* (2006.01)

(52) U.S. Cl. ..................... 252/582; 359/350; 385/143; 264/1.24

(58) Field of Classification Search ................ 359/558; 252/582
See application file for complete search history.

(56) References Cited
U.S. PATENT DOCUMENTS

| | | | |
|---|---|---|---|
| 5,378,776 A * | 1/1995 | Matsumura et al. | 526/64 |
| 6,132,650 A * | 10/2000 | Nakamura | 264/1.29 |
| 6,166,125 A * | 12/2000 | Sugiyama et al. | 524/462 |
| 6,271,312 B1 * | 8/2001 | Koike et al. | 525/199 |
| 6,342,571 B1 * | 1/2002 | Smith et al. | 526/286 |
| 6,576,391 B1 * | 6/2003 | Iguchi et al. | 430/270.1 |
| 2003/0085387 A1 * | 5/2003 | Fujiyama et al. | 252/582 |

FOREIGN PATENT DOCUMENTS

| JP | 09157332 A1 * | 6/1997 |
|---|---|---|
| JP | 03183246 A1 * | 7/2003 |

\* cited by examiner

*Primary Examiner*—Randy Gulakowski
*Assistant Examiner*—Timothy J. Kugel
(74) *Attorney, Agent, or Firm*—Sughrue Mion, PLLC

(57) ABSTRACT

A novel optical member is disclosed. The optical member comprises a region having a distributed refractive index, wherein the region is formed from a composition used for producing an optical member comprising a polymerizable monomer and a compound represented by formula (1) (where $R^1$, $R^2$ and $R^3$ independently denote a C1–20 alkyl group, C3–6 cycloalkyl group, halogen atom, $CH_2$=CH—, $R^4$—$Y^1$— or $R^4$—C(=$Y^2$)$Y^3$—, $R^4$ denotes a C1–9 alkyl group, $CH_2$=CH— or $CH_2$=C($CH_3$)—, and $Y^1$, $Y^2$ and $Y^3$ are independently oxygen or sulfur; l and n are respectively integers of 0 to 5 and m is an integer of 0 to 4, provided that at least one of l, m and n is not 0; q, u and v are independently integers of 0 to 2) having a refractive index differing from that of the polymerizable monomer;

Formula (1)

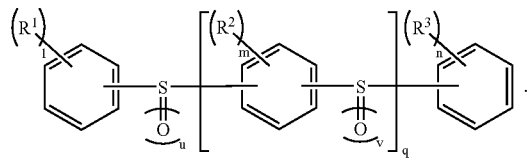

10 Claims, No Drawings

OPTICAL MEMBERS, COMPOSITIONS, METHODS AND S-CONTAINING COMPOUNDS FOR PRODUCING THEM

TECHNICAL FIELD

The present invention belongs to the technical field of plastic optical members, in particular to the technical field of plastic optical members preferably applicable to plastic light fibers, light guides, or optical lenses, and polymerizable compositions and methods for producing the plastic optical members. The present invention also relates to novel sulfur-containing (hereinafter S-containing compounds) useful as an agent for adjusting refractive index.

RELATED ART

In recent years, plastic optical members have been widely used for various applications including optical fibers and optical lenses, by virtue of their advantages such as allowing for more simple producing and processing at a lower cost as compared with quartz-base optical members having the same structure. Plastic optical fibers are slightly inferior to quartz-base fibers since the entire region of the fiber element thereof is made of plastic material and has, as a consequence, large transmission loss. On the other hand, plastic optical fibers are superior to quartz-base optical fibers in having excellent flexibility, lightweight property, workability, better applicability in producing a large bore diameter fiber and a lower cost. The plastic optical fiber is thus studied as a transmission medium for optical communication which is effected over a relatlvely short distance, which allows for such large transmission loss to be ignored.

The plastic optical fiber generally has a center core (referred to as "core region" in the specification) made of an organic compound and comprises a polymer matrix, and an outer shell (referred to as "clad region" in the specification) made of an organic compound having a refractive index differing from (generally lower than) that of the core region. In particular, the plastic optical fiber having a distributed refractive index along the direction from the center to the outside thereof recently attracts a good deal of attention as an optical fiber which can ensure a high transmission capacity.

As a method for producing refractive-index-distributed optical members, there has been provided a method comprising forming a fiber base member (referred to as "preform" in the specification) according to an interfacial gel polymerization process and then drawing the preform.

As described above, optical fibers having a little transmission loss and a broad transmission band have been generally required. It is understood that refractive-index-distributed optical fibers exhibits broad transmission band, however, refractive-index-distributed structures cannot always provide improvement of transmission band. For example, as described in "Polymer Journal, vol. 28, p. 272~275", it is necessary to adjust the refractive-index-distributed structures and to make enough difference in refractive indexes between the core and clad region in order to obtain broad transmission band. Therefore, the core region often comprises not only a matrix material but also an additive (referred to as "refractive-index-adjusting-agent" or "dopant" in the specification, which may be a polymerizable or non-polymeraizable compound) having a different refractive index from that of the matrix. There has been provided various refractive-index-adjusting-agents such as compounds disclosed in WO93/08488. By use of the refractive-index-adjusting-agents, a certain improvement in optical characteristics mentioned above can be obtained. However, since optical fibers are used in practice under various environments, optical fibers having not only excellent optical characteristics mentioned above but also enough good mechanical characteristics and adequate thermo-stablilty for use in various environments have been required. Furthermore, optical fibers are required to keep excellent optical characteristics even if they are transformed, such as by bending, since they are sometimes subjected to external forces in practice. However, there has been not yet provided optical fibers having excellent optical characteristics, mechanical characteristics and adequate thermo-stability for use in practice.

SUMMARY OF THE INVENTION

One object of the present invention is to provide polymerizable compositions capable of producing optical members having slight loss of transmission light and slight increase of transmission light loss due to bending and high thermo-stability. Another object of the present invention is to provide optical members having slight loss of transmission light and slight increase of transmission light loss due to bending and high thermo-stability. Another object of the present invention is to provide novel S-containing compounds useful as an agent for adjusting refractive index.

In one aspect, the present invention provides a composition used for producing an optical member comprising a polymerizable monomer and a compound represented by formula (1) below having a refractive index differing from that of the polymerizable monomer;

Formula (1)

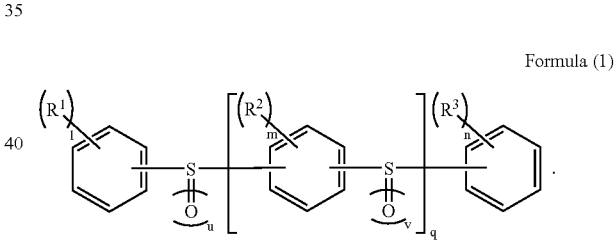

where $R^1$, $R^2$ and $R^3$ independently denote a C1–20 alkyl group, C3–6 cycloalkyl group, halogen atom, $CH_2\!=\!CH\!-\!$, $R^4\!-\!Y^1\!-\!$ or $R^4\!-\!C(\!=\!Y^2)Y^3\!-\!$, $R^4$ denotes a C1–9 alkyl group, $CH_2\!=\!CH\!-\!$ or $CH_2\!=\!C(CH_3)\!-\!$, and $Y^1$, $Y^2$ and $Y^3$ are independently oxygen or sulfur; l and n are respectively integers of 0 to 5 and m is an integer of 0 to 4, provided that at least one of l, m and n is not 0; q, u and v are independently integers of 0 to 2.

As preferred embodiments, there has been provided the composition wherein the polymerizable monomer comprises an ester of propenoic acid or derivatives thereof as a major component; the composition wherein the polymerizable monomer comprises an ester of (meth)acrylic acid or derivatives thereof as a major component; the composition wherein the polymeraizable monomer comprises a compound having a halogen atom and at least one of $R^1$, $R^2$ and $R^3$ contains a halogen atom; the composition wherein the polymerizable monomer comprises a compound having a fluorine atom and at least one of $R^1$, $R^2$ and $R^3$ contains a fluorine atom; the composition wherein the compound is represented by formula (2) or formula (3) below;

Formula (2)

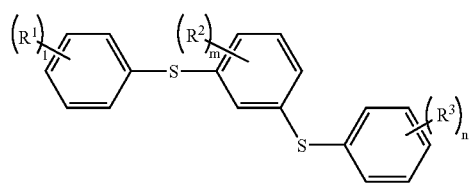

Formula (3)

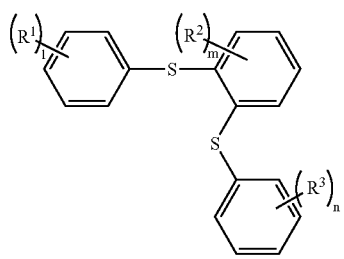

where $R^1$, $R^2$, $R^3$, l, m and n have the same meanings as defined above respectively.

In another aspect, the present invention provides a method for producing an optical member, comprising forming a region having a distribution in the refractive index by polymerization of a composition comprising a polymerizable monomer and a compound represented by formula (1) below having a refractive index differing from that of the polymerizable monomer:

Formula (1)

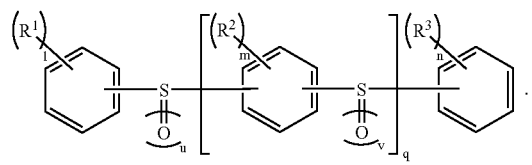

where $R^1$, $R^2$ and $R^3$ independently denote a C1–20 alkyl group, C3–6 cycloalkyl group, halogen atom, $CH_2$=CH—, $R^4$—$Y^1$— or $R^4$—C(=$Y^2$)$Y^3$—, $R^4$ denotes a C1–9 alkyl group, $CH_2$=CH— or $CH_2$=C($CH_3$)—, and $Y^1$, $Y^2$ and $Y^3$ are independently oxygen or sulfur; l and n are respectively integers of 0 to 5 and m is an integer of 0 to 4, provided that at least one of l, m and n is not 0; q, u and v are independently integers of 0 to 2.

As preferred embodiments, there has been provided the method wherein the region is formed by an interfacial gel polymerization of the composition; the method wherein the region has a concentration distribution of the compound or a distribution of the copolymerization ratio of the polymerizable monomer and the compound, thereby having the distribution in the refractive index.

In another aspect, the present invention provides an optical member comprising a region having a distribution in the refractive index, formed by polymerization of a composition comprising a polymeraizable monomer and a compound represented by formula (1) below having a refractive index differing from that of the polymerizable monomer:

Formula (1)

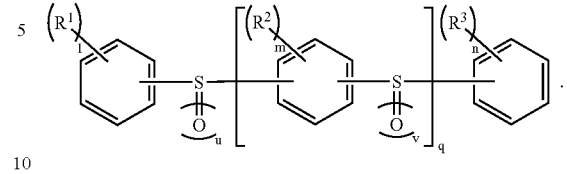

where $R^1$, $R^2$ and $R^3$ independently denote a C1–20 alkyl group, C3–6 cycloalkyl group, halogen atom, $CH_2$=CH—, $R^4$—$Y^1$— or $R^4$—C(=$Y^2$)$Y^3$—, $R^4$ denotes a C1–9 alkyl group, $CH_2$=CH— or $CH_2$=C($CH_3$)—, and $Y^1$, $Y^2$ and $Y^3$ are independently oxygen or sulfur; l and n are respectively integers of 0 to 5 and m is an integer of 0 to 4, provided that at least one of l, m and n is not 0; q, u and v are independently integers of 0 to 2.

As preferred embodiments, there has been provided the optical member wherein the region is formed by an interfacial gel polymerization of the composition; the optical member wherein the region has a concentration distribution of the compound or a distribution of the copolymerization ratio of the polymerizable monomer and the compound, thereby having the distribution in the refractive index; the optical member wherein refractive index in the region is distributed along with the direction from the center to the outside in cross section thereof; the optical member, comprising a core region and a clad region cladding the core region and having different refractive index from that of the core region, wherein the core region has a distribution in the refractive index and is formed by polymerization of the composition; the optical member used as an optical fiber, light guide member or optical lens.

In another aspect, the present invention provides a compound represented by formula (2) or formula (3) below:

Formula (2)

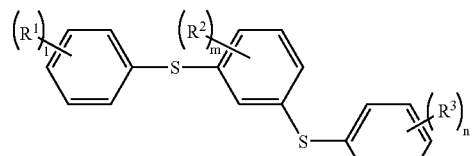

Formula (3)

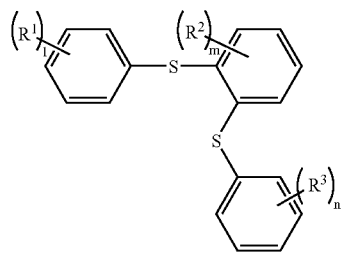

where $R^1$, $R^2$ and $R^3$ independently denote a C1–20 alkyl group, C3–6 cycloalkyl group, halogen atom, $CH_2$=CH—, $R^4$—$Y^1$— or $R^4$—C(=$Y^2$)$Y^3$—, $R^4$ denotes a C1–9 alkyl group, $CH_2$=CH— or $CH_2$=C($CH_3$)—, and $Y^1$, $Y^2$ and $Y^3$ are independently oxygen or sulfur; l and n are respectively integers of 0 to 5 and m is an integer of 0 to 4, provided that at least one of l, m and n is not 0.

DETAILED DESCRIPTION OF THE INVENTION

The present invention will be detailed hereinafter.

The description will be started with polymerizable compositions according to the present invention.

[Polymerizable Composition for Optical Member]

The polymerizable composition according to the present invention comprises a polymerizable monomer and a compound (referred to as "refractive-index-adjusting-agent" or "dopant" in the specification) having a different refractive index from that of the polymerizable monomer. The composition may further comprise a polymerization initiator for initiation of polymerization of the monomer and a chain transfer agent so as to improve productivity. The composition may be used for producing optical members having a distribution in the refractive index.

Various components used in the composition according to the present invention will be detailed hereinafter.

(Polymerizable Monomer)

In the present invention, the polymerizable monomer preferably comprises an ester of propenoic acid or derivatives thereof as a major component. Examples of the ester of propenoic acid or derivatives thereof include acrylic esters and methacrylic esters (both are referred as "(meth)acrylic esters" hereinafter). The monomer may comprise other polymerizable compounds unless the optical property of the copolymer of the major component and another component is substantively the same as that of the homopolymer of the major component. Thus, the polymerizable monomer may be in the form of a composition comprising (meth)acrylic esters and other polymerizable compounds such as styrene or maleimide. Partially or wholly deuterated (meth)acrylic esters are also preferred since transmission light loss due to C—H stretching vibration can be reduced. Fluorinated (meth)acrylic esters are also preferred since a large difference in refractive indexes between polymers formed of fluorinated (meth)acrylic esters and another polymers formed of non-fluorinated (meth)acrylic esters can be obtained, which facilitates building of refractive-index-distributed structures.

Examples of (meth)acrylic asters, which can be used in the present invention, but not specifically limited to, are shown below:

(a) Non-fluorine-containing methacrylic esters and acrylic esters such as methyl methacrylate, ethyl methacrylate, i-propyl methacrylate, t-butyl methacrylate, benzyl methacrylate, phenyl methacrylate, cyclohexyl methacrylate, diphenyl methyl methacrylate, tricyclo decanyl methacrylate, adamantyl methacrylate, i-bornyl methacrylate, methyl acrylate, ethyl acrylate, t-butyl acrylate and phenyl acrylate;

(b) Fluorine-containing methacrylic esters and acrylic esters such as 2,2,2-trifluoroethyl methacrylate, 2,2,3,3-tetrafluoropropyl methacrylate, 2,2,3,3,3-pentafluoropropyl methacrylate, 1-trifluoromethyl-2,2,2-trifluoroethyl methacrylate, 2,2,3,3,4,4,5,5-octafluoropenthyl methacrylate and 2,2,3,3,4,4-hexafluorobuthyl methacrylate.

As described above, polymeraizable compounds another than (meth)acrylic esters may be used in the present invention. Examples of the another polymerizable compounds, which can be used in the present invention, but not specifically limited to, are shown below:

(c) styrene based compounds such as styrene, a-methylstyrene, methyistyrene, chloro styrene and bromo styrene;

(d) vinyl esters such as vinyl acetate, vinyl benzoate, vinyl phenylacetate and vinyl chioroacetate; (e) maleimide based compounds such as N-n-butyl mafelmide, N-t-butyl maleimide, N-i-propyl maleimlde and N-cyclohexyl maleimide.

The polymerizable composition according to the present invention may comprise single or multiple species of (meth) acrylic esters as a major component. The preferred amount of (meth)acrylic esters is 50 wt % or more with respect to the total weight of the polymerizable monomer, more preferably 50 wt % o or more, much more preferably 70 wt % or more, most preferably 100 wt %.

(Dopant: Agent for Adjusting Refractive Index)

The polymerizable composition of the present invention comprises a dopant having a different refractive index from that of the polymerizable monomer. The dopant is also known as an agent for adjusting refractive index such that a composition containing the agent has a higher refractive index than that of a composition not containing the agent, or a copolymer containing the agent as a copolymerization component has a higher refractive index than that of a copolymer not containing the agent. The difference in refractive indexes between the compositions or the copolymers is preferably 0.01 or more. Examples of the dopant include polymerizable and non-polymerizable compounds. Using the polymerizable dopant, so as to obtain a matrix formed of a copolymer of the dopant and the monomer, may complicate adjusting various characteristics of optical members, however, may improve their thermo-stability.

According to the present invention, a compound represented by formula (1) below is used as a dopant.

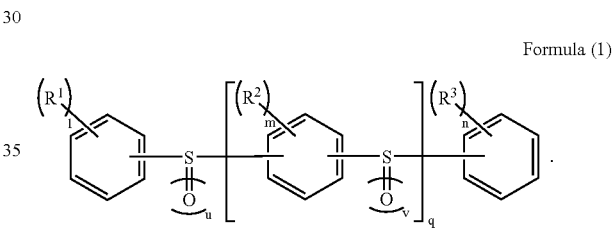

Formula (1)

In the formula (1), $R^1$, $R^2$ and $R^3$ independently denote a C1–20 alkyl group, C3–6 cycloalkyl group, halogen atom, $CH_2=CH—$, $R^4—Y^1—$ or $R^4—C(=Y^2)Y^3—$, $R^4$ denotes a C1–9 alkyl group, $CH_2=CH—$ or $CH_2=C(CH_3)—$, and $Y^1$, $Y^2$ and $Y^3$ are independently oxygen or sulfur. Thus, the $R^4—Y^1—$ includes $R^4—O—$ and $R^4—S—$ and the $R^4—C(=Y^2)Y^3—$ includes $R^4—C(=O)O—$, $R^4—C(=O)S—$, $R^4—C(=S)O—$ and $R^4—C(=S)S—$.

$R^1$, $R^2$ and $R^3$ preferably denote C1–20 alkyl group such as methyl, ethyl, n-propyl, i-propyl, n-butyl, i-butyl and t-butyl; C3–6 cycloalkyl group such as cyclohexyl, halogen, $CH_2=CH—$, $CH_2=CH—O—$, $CH_2=CH—S—$, $CH_2=CH—C(=O)O—$, $CH_2=C(CH_3)—C(=O)O—$, $CH_2=CH—C(=O)S—$, $CH_2=C(CH_3)—C(=O)S—$, $R^{4'}—C(=O)O—$ ($R^{4'}$ denotes a C1–9 alkyl group and $R^{4'}$ has the same meaning hereinafter), $R^{4'}—C(=O)S—$, $R^{4'}—C(=S)O—$, $R^{4'}—C(=S)S—$, $R^{4'}—C(=O)—$, $R^{4'}—O—$ or $R^{4'}—S—$.

$R^1$, $R^2$ and $R^3$ more preferably denote a C1–12 alkyl group, halogen, $CH_2=CH—O—$, $CH_2=CH—S—$, $CH_2=CH—C(=O)O—$, $CH_2=C(CH_3)—C(=O)O—$, $CH_2=CH—C(=O)S—$, $CH_2=C(CH_3)—C(=O)S—$, $R^{4'}—C(=O)O—$, $CH_3—C(=O)S—$, $R^{4'}—C(=O)—$, $R^{4'}—O—$ or $R^{4'}—S—$, much more preferably a C1–12 alkyl group, halogen, $CH_2=CH—C(=O)O—$, $CH_2=C(CH_3)—C(=O)S—$, $CH_2=CH—C(=O)S—$, $CH_2=C(CH_3)—C(=O)S—$, $R^{4'}—C(=O)O—$, $R^{4'}—C(=O)S—$, $R^{4'}—C(=O)—$, $R^{4'}—O—$ or $R^{4'}—S—$.

The number of carbon atoms respectively included in $R^1$, $R^2$ and $R^3$ is preferably 1 to 9, more preferably 1 to 6. Preferred examples of halogen are fluorine, chlorine, and bromine.

$R^1$, $R^2$ and $R^3$ may be substituted. Whether substituted $R^1$, $R^2$ and $R^3$ are preferred or not, or what kind of substituents preferred depends on the species of polymerizable monomer used in combination with the dopant. For example, when the dopant is used in combination with a halogen-containing (preferably fluorine-containing) polymerizable monomer, halogenated $R^1$, $R^2$ and $R^3$ are preferred, and fluorinated $R^1$, $R^2$ and $R^3$, such as $R^1$, $R^2$ and $R^3$ substituted by $CF_3$, are more preferred. The dopant in which $R^1$, $R^2$ and $R^3$ respectively have (fluorine)-containing substituents may have a high affinity (solubility) for the matrix formed from halogenated polymerizable monomer.

In the formula (1), u and v are independently integers of 0 to 2, preferably 0 or 1, more preferably 0. l and n are respectively integers of 0 to 5 and m is an integer of 0 to 4, provided that at least one of l, m and n is not 0. l and n are preferably integers of 1 to 5, more preferably 2 to 5. m is preferably an integer of 1 to 4, more preferably 1 to 3. q is an integer of 0 to 2, preferably 0 or 1, more preferably 1.

When q is 1 or 2, there are various isomers, however, among them, considering various characteristics such as optical characteristics, arylthio compounds represented by formula (2) or (3) below are preferred.

Formula (2)

Formula (3)

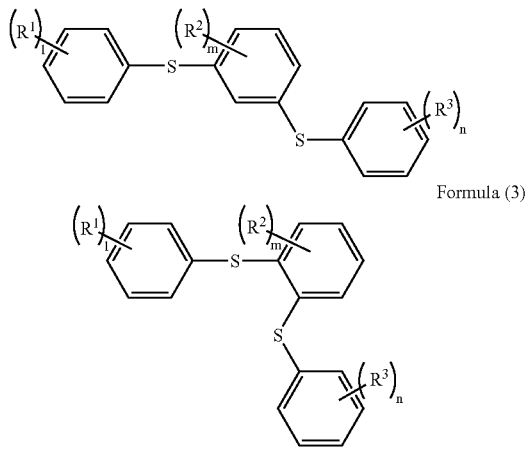

In the formulae, $R^1$, $R^2$ and $R^3$ independently denote a C1–12 alkyl group, C3–6 cycloalkyl group, halogen atom, $CH_2=CH-$, $R^4-Y^1-$ or $R^4-C(=Y^2)Y^3-$, $R^4$ denotes a C1–9 alkyl group, $CH_2=CH-$ or $CH_2=C(CH_3)-$, and $Y^1$, $Y^2$ and $Y^3$ are independently oxygen or sulfur. Thus, the $R^4-Y^1-$ includes $R^4-O-$ and $R^4-S-$ and the $R^4-C(=Y^2)Y^3-$ includes $R^4-C(=O)O-$, $R^4-C(=O)S-$, $R^4-C(=S)O-$ and $R^4-C(=S)S-$.

$R^1$, $R^2$ and $R^3$ preferably denote C1–12 alkyl group such as methyl, ethyl, n-propyl, i-propyl, n-butyl, i-butyl and t-butyl; C3–6 cycloalkyl group such as cyclohexyl, halogen, $CH_2=CH-$, $CH_2=CH-O-$, $CH_2=CH-S-$, $CH_2=CH-C(=O)O-$, $CH_2=C(CH_3)-C(=O)O-$, $CH_2=CH-C(=O)S-$, $CH_2=C(CH_3)-C(=O)S-$, $R^{4'}-C(=O)O-$ ($R^{4'}$ denotes a C1–9 alkyl group and so forth), $R^{4'}-C(=O)S-$, $R^{4'}-C(=S)O-$, $R^{4'}-C(=S)S-$, $R^{4'}-C(=O)-$, $R^{4'}-O-$ or $R^{4'}-S-$.

$R^1$, $R^2$ and $R^3$ more preferably denote a C1–12 alkyl group, halogen, $CH_2=CH-O-$, $CH_2=CH-S-$, $CH_2=CH-C(=O)O-$, $CH_2=C(CH_3)-C(=O)O-$, $CH_2=CH-C(=O)S-$, $CH_2=C(CH_3)-C(=O)S-$, $R^{4'}-C(=O)O-$, $CH_3-C(=O)S-$, $R^{4'}-C(=O)-$, $R^{4'}-O-$ or $R^{4'}-S-$, much more preferably a C1–12 alkyl group, halogen, $CH_2=CH-C(=O)O-$, $CH_2=C(CH_3)-C(=O)O-$, $CH_2=CH-C(=O)S-$, $CH_2=C(CH_3)-C(=O)S-$, $R^{4'}-C(=O)O-$, $R^{4'}-C(=O)S-$, $R^{4'}-C(=O)-$, $R^{4'}-O-$ or $R^{4'}-S-$.

The number of carbon atoms respectively included in $R^1$, $R^2$ and $R^3$ is preferably 1 to 9, more preferably 1 to 6. Preferred examples of halogen include fluorine, chlorine, and bromine.

In the formulae, l and n are respectively integers of 0 to 5 and m is an integer of 0 to 4, provided that at least one of l, m and n is not 0. l and n are preferably integers of 1 to 5, more preferably 1 to 4. m is preferably an integer of 1 to 4, more preferably 1 to 3.

Examples of compounds represented by the formula (1) are shown below, but not specifically limited to.

(1-1)
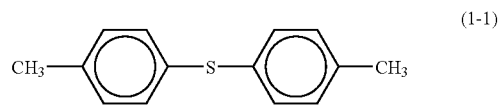

(1-2)
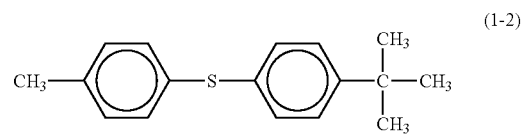

(1-3)
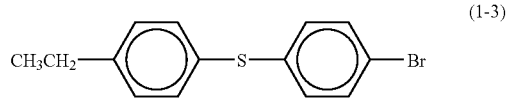

(1-4)
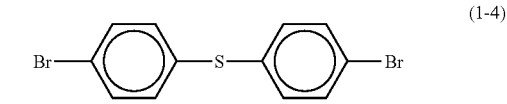

(1-5)
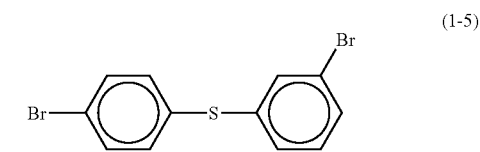

(1-6)
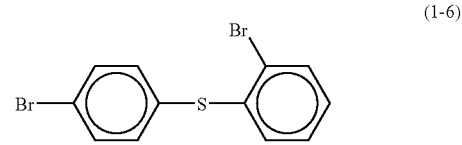

(1-7)
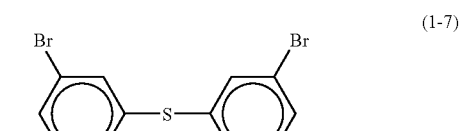

(1-8)
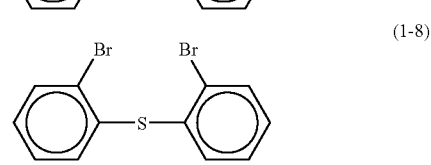

-continued
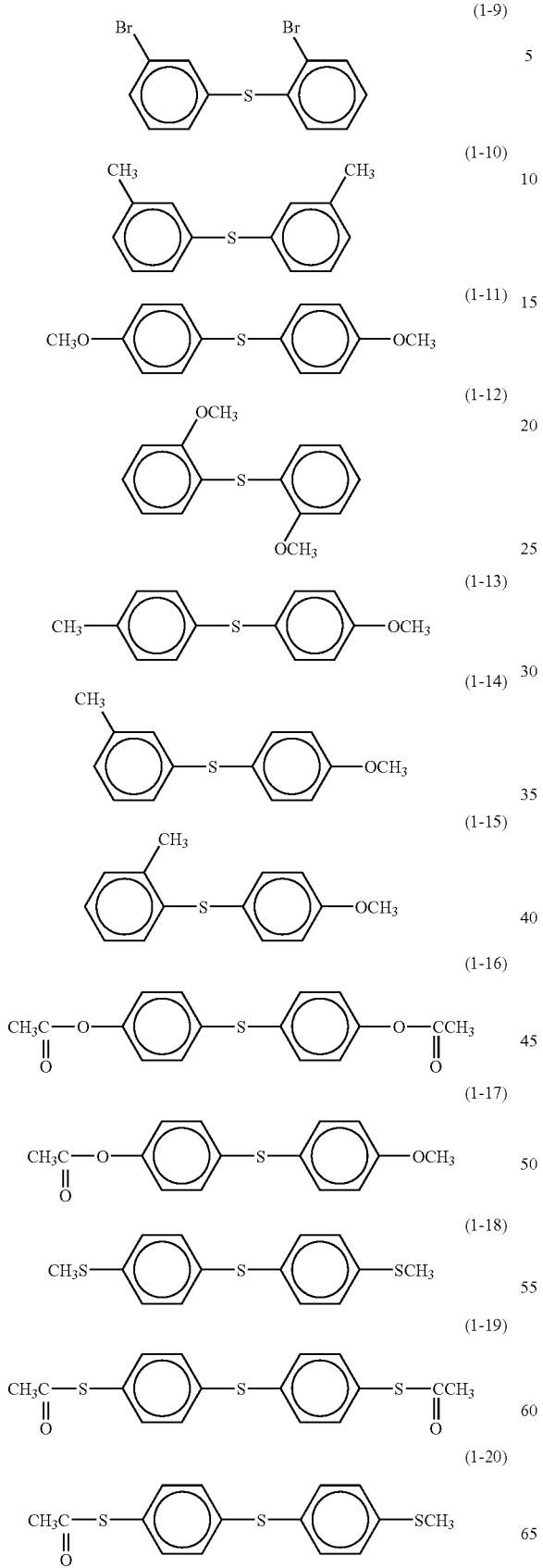
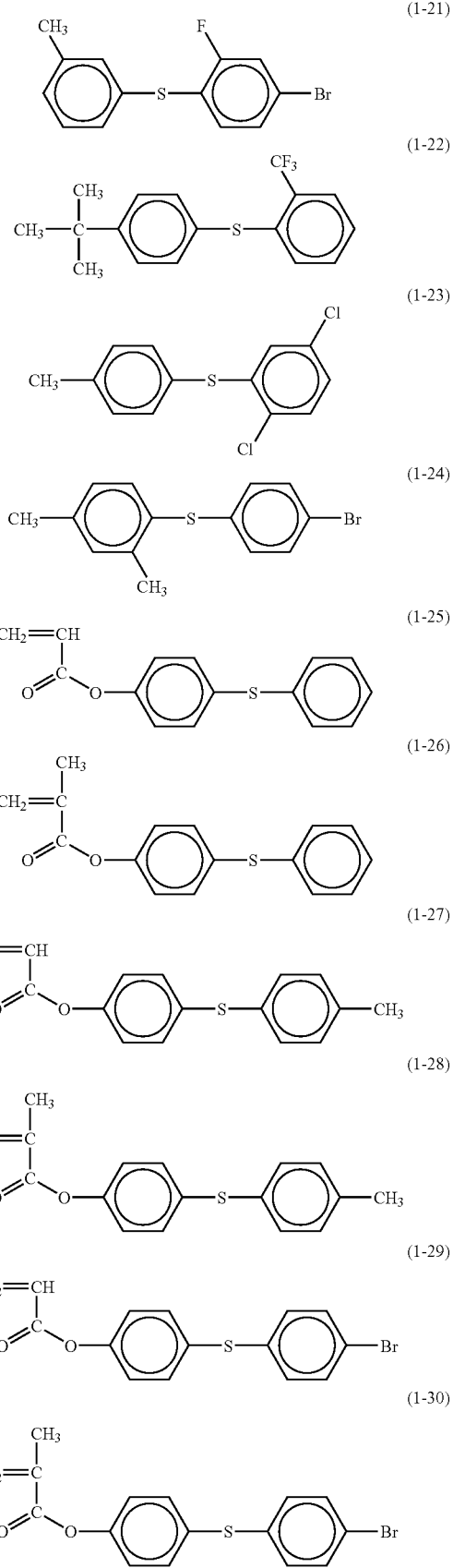

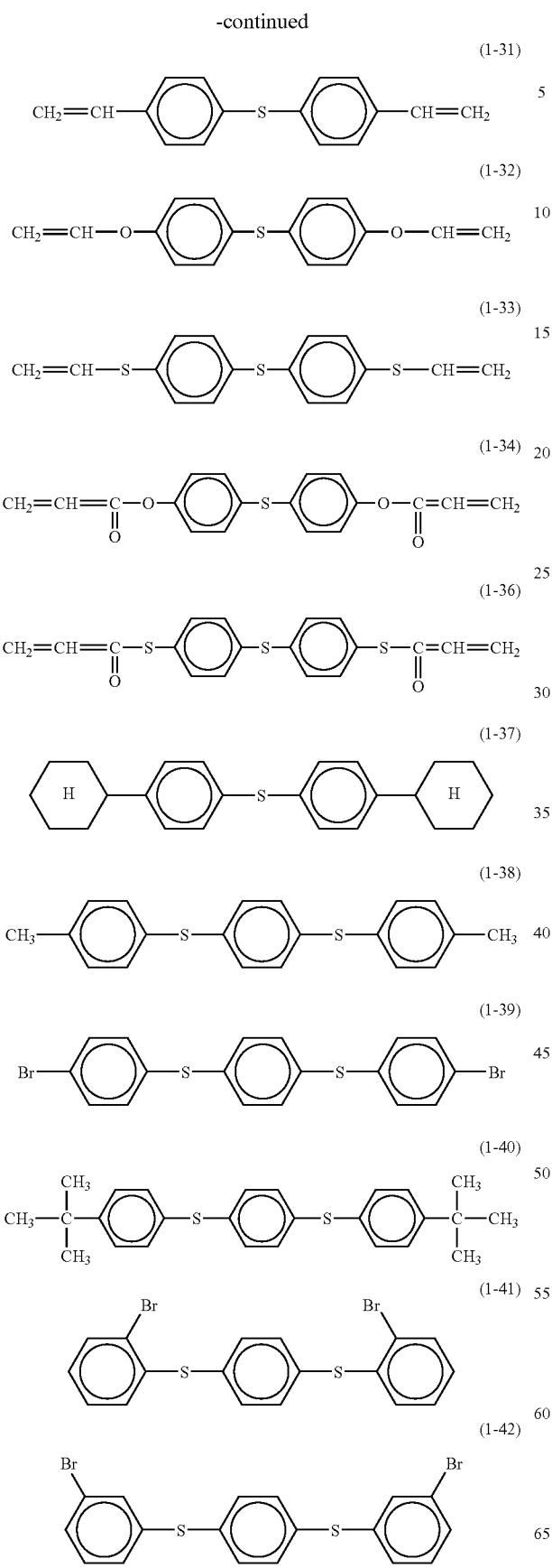
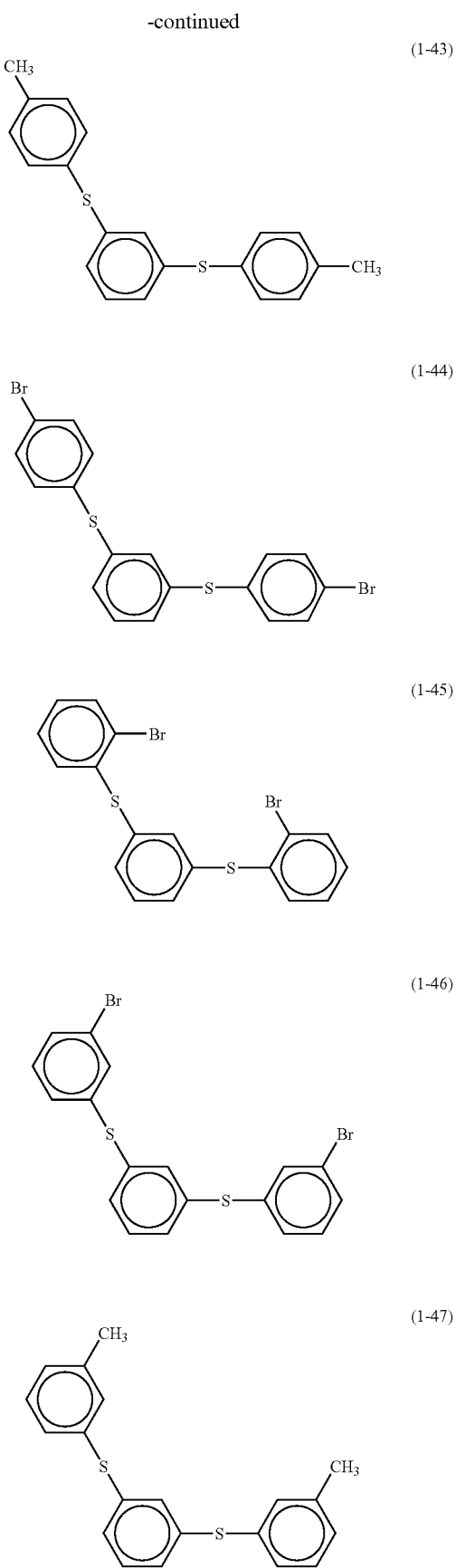

-continued
(1-48)
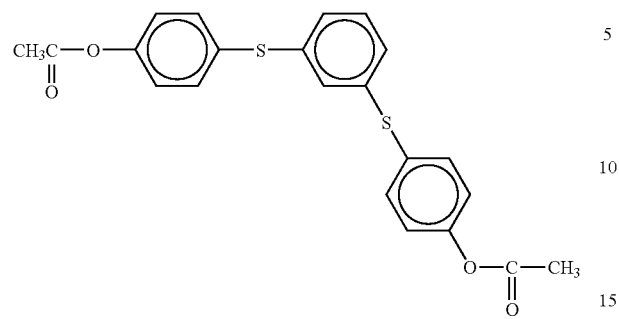
(1-49)
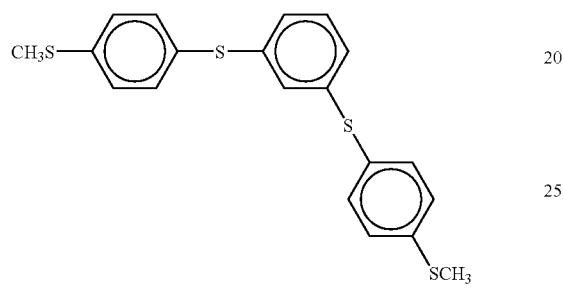
(1-50)
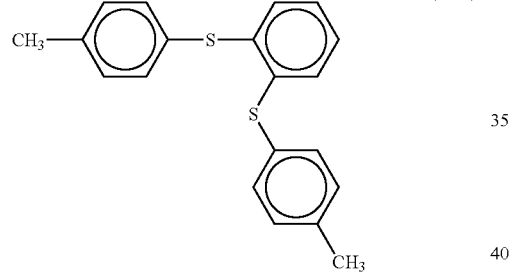
(1-51)
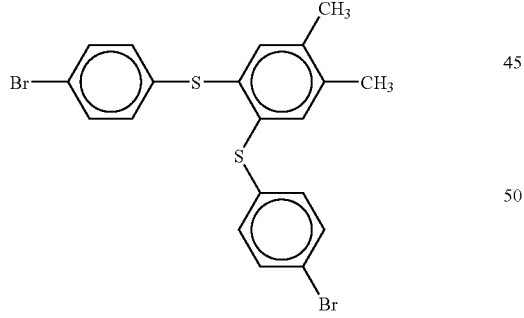
(1-52)
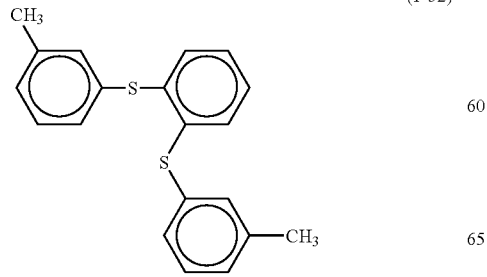
(1-53)
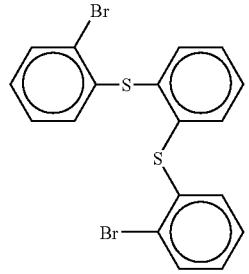
(1-54)
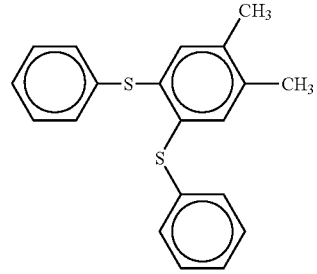
(1-55)
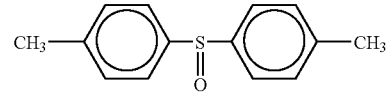
(1-56)
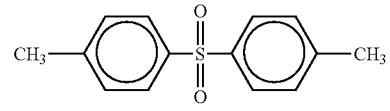
(1-57)
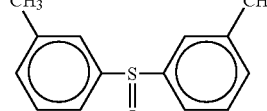
(1-58)
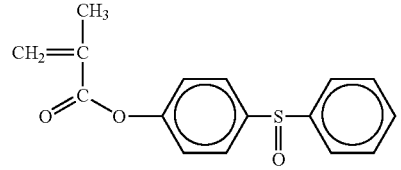
(1-59)
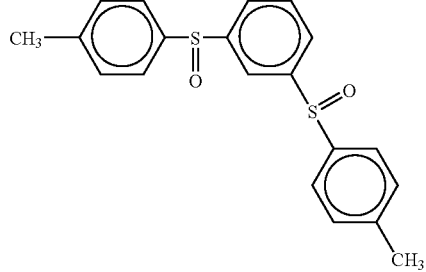

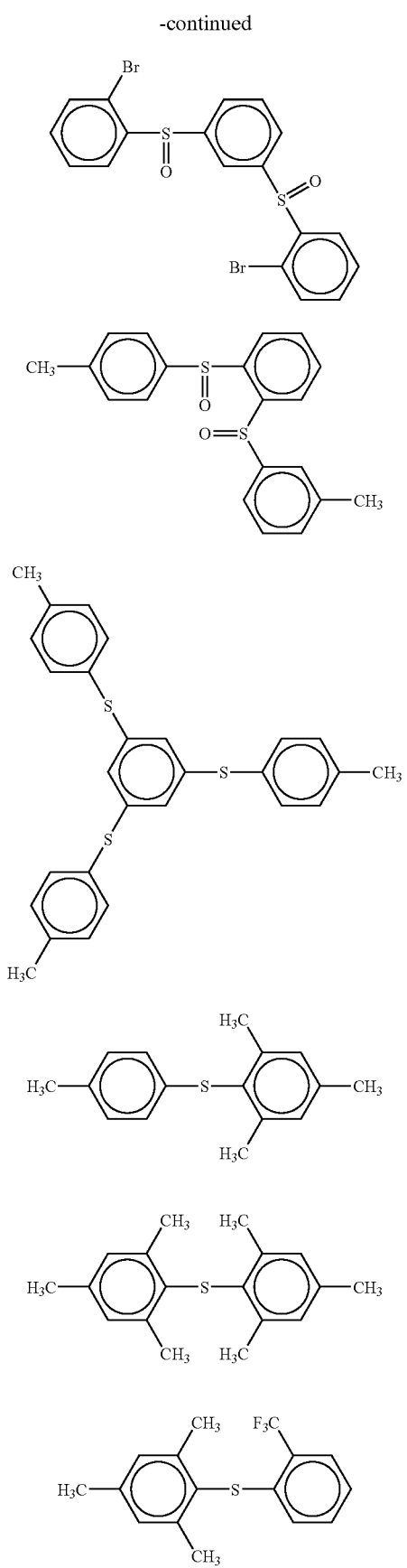
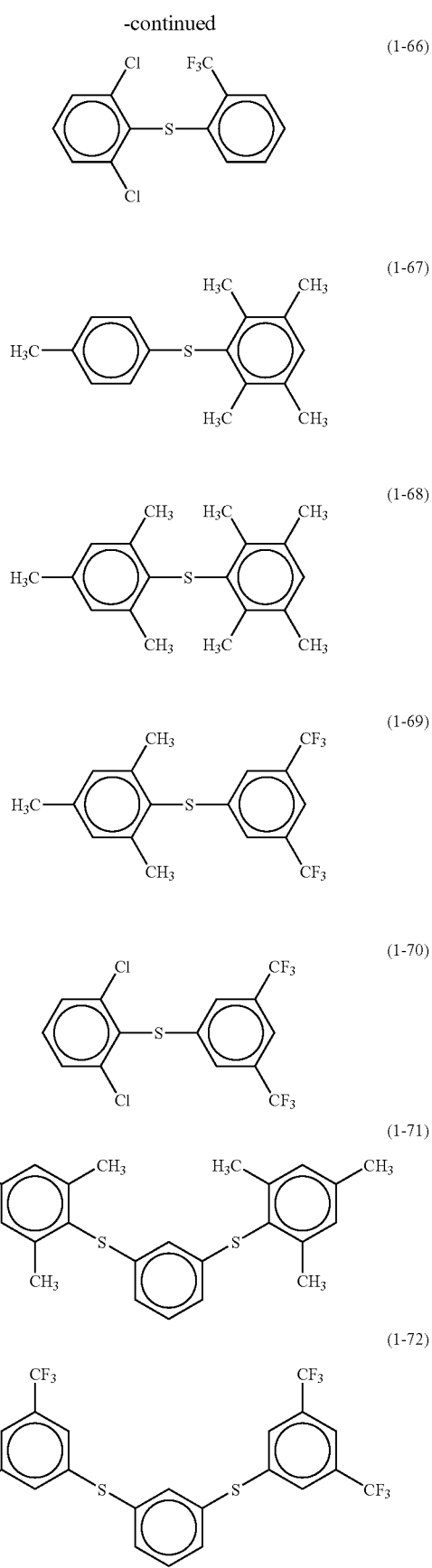

-continued

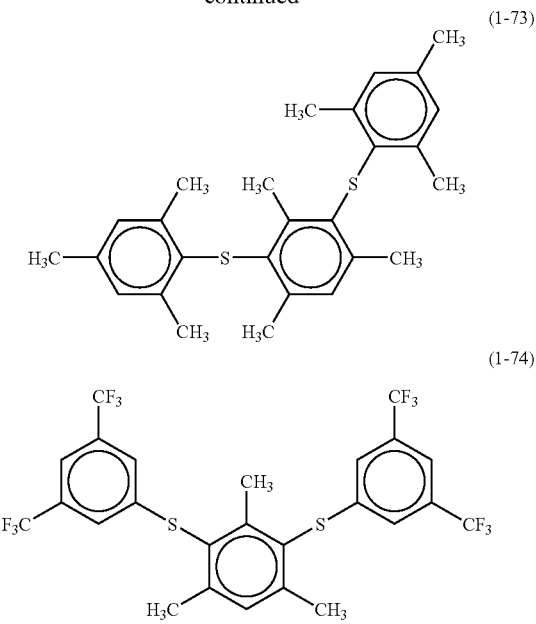

The polymerizable composition according to the present invention may comprise a dopant represented by the formula (1) in combination with a dopant selected from compounds having the structure of the formula (1) or another structures.

It is desirable to add the dopant of not less than 0.5 wt % with respect to the total weight of the polymerizable composition. It is also desirable to add the dopant of not greater than 50 wt %, more desirable not greater than 25 wt %, with respect to the total weight of the polymerizable composition. The greater amount of the dopant is, the higher plasticity of the polymer obtained by polymerization of the composition is. On the other hand, when the amount of the dopant is too small, it is not easy to adjust the refractive index of the polymer and obtain the effect of the present invention.

By polymerizing the composition according to the present invention so as to produce a gradient in the concentration of the dopant represented by the formula (1), an optical member within which the refractive index varies along with such concentration distribution can be obtained. The gradient in the concentration of the dopant may be produced by interfacial gel polymerization of the composition or the like.

(Polymerization Initiator)

The polymerizable composition according to the present invention preferably comprises a polymerization initiator. The polymerization initiator can properly be selected in consideration of the monomer to be employed. Possible examples thereof include peroxide compounds such asbenzoyl peroxide (BPO), t-butylperoxy-2-ethylhexanate (PBO), di-t-butylperoxide (PBD), t-butylperoxyisopropylcarbonate (PBI), and n-butyl-4,4-bis(t-butylperoxy)valerate (PHV); and azo compounds such as 2,2'-azobisisobutylonitrile, 2,2'-azobis(2-methylbutylonitrile), 1,1'-azobis(cyclohexane-1-carbonytrilie), 2,2'-azobis(2-methylpropane), 2,2'-azo-bis(2-methylbutane), 2,2'-azo-bis(2-ethylbutane), 2,2'-azobis(2-methylpentane), 2,2'-azobis(2,3-dimethylbutane), 2,2'-azobis(2-methylhexane), 2,2'-azobis(2,4-dimethylpentane), 2,2'-azobis(2,3,3-trimethylbutane), 2,2'-azobis(2,4,4-trimethylpentane), 3,3'-azobis(3-methylpentane), 3,3'-azobis(3-methylhexane), 3,3'-azobis(3,4-dimethylpentane), 3,3'-azo-bis(3-ethylpentane), dimethyl-2,2'-azobis(2-methylpropionate), diethyl-2,2'-azobis(2-methylpropionate), di-t-butyl-2,2'-azobis(2-methylpropionate).

These polymerization initiators may be used in any combination of two or more species.

(Chain Transfer Agent)

The polymerizable composition according to the present invention preferably comprises a chain transfer agent. The chain transfer agent is used mainly for adjusting molecular weight of the polymer. The chain transfer agent and the amount thereof can properly be selected in consideration of the monomer to be employed. The chain transfer constants of the chain transfer agents for various monomers are referred to publications such as "Polymer Handbook $3^{rd}$ edition" edited by J. BRANDRUP and E. H. IMMERGUT, published by JOHN WILEY&SON. The chain transfer constants can be obtained by experimental tests according to methods disclosed in "Kohbunshi gousei no jikkenhou (Experimental methods for polymer synthesis)" written by Takayuki Ohtsu and Masaetsu Kinoshita, published by Kagaku-Dojin Publishing Company, INC (1972).

For the case where a methyl methacrylate-base monomer is used as the polymerizable monomer, preferable examples of chain transfer agents include alkylmercaptans (n-butylmercaptan, n-pentylmercaptan, n-octylmercaptan, n-laurylmercaptan, t-dodecylmercaptan, etc.), thiophenols (thiophenol, m-bromothiophenol, p-bromothiophenol, m-toluenethiol, p-toluenethiol, etc.). Particularly preferable species are n-octylmercaptan, n-laurylmercaptan and t-dodecylmercaptan. It is also allowable to use the chain transfer agent having deuterium substituted for hydrogen atom on C—H bond. These chain transfer agents may be used in any combination of two or more species.

A preferable range of the amount addition thereof may properly be determined typically in consideration of species of the monomer to be employed, where a desirable amount of addition of the polymerization initiator is generally in a range from 0.005 to 0.5 wt % of the monomer, and more preferably in a range from 0.010 to 0.5 wt %, and a desirable amount of addition of the chain transfer agent is generally in a range from 0.10 to 0.40 wt % of the monomer, and more preferably in a range from 0.15 to 0.30 wt %. A desirable amount of addition of the dopant is generally 1 to 30 wt % of the monomer, and more preferably 1 to 25 wt %.

Another possible strategy relates to addition of other additives to the composition according to the present invention to an extent not degrading the light transmission property. For example, an additive can be added in order to improve the weatherability or durability. It is also allowable to add an emission inductive material for amplifying light signal for the purpose of improving the light transmission property. Since even attenuated light signal can be amplified by addition of such compound to thereby elongate the length of transmission, the compound is typically applicable to produce a fiber amplifier at a part of light transmission link.

When heat and/or light is irradiated to the polymeraizable composition according to the present invention, radicals and the like are generated from the polymerization initiator, thereby inducing polymerization of the polymerizable monomers. Since the polymeraizable composition comprises the dopant, the refractive-index-distributed structure can readily be obtained by controlling the proceeding direction of the polymerization, typically in the interfacial gel polymerization process described later, so as to create a gradient of the dopant concentration to thereby create a distribution of the dopant concentration or the copolymerization ratio of the dopant and the monomer. According to the present invention, since the compound represented by the formula (1) is used as a dopant, the obtained optical member having slight loss of transmission light, slight increase of transmission light loss due to bending and high thermo-stability can be produced. The rate and degree of polymerization can be controlled by addition of the polymerization initiator or the chain transfer agent optionally added to the composition, so as that the molecular weight of the polymer can be controlled. Since the mechanical characteristics of the polymer may depend on the molecular weight of the polymer, in some cases such that optical fibers are produced by pulling the polymer, controlling the molecular weight may also contribute to improvement in productivity of optical members.

In the present specification, the term "transmission light loss due to bending" means, as described in JP-A No. hei 7-244220, (the term "JP-A" as used herein means an "unexamined published Japanese patent application) transmission light loss due to micro structural defect developed in an optical member when the bending stress of the optical member is enough high for the optical member to transfer to plastic deformation phase, and a method for measuring the transmission light loss due to bending will be described in Examples Section.

One embodiment of the optical member according to the present invention is a plastic optical member comprising a core region having a distribution in the refractive index and a clad region cladding the core region and having a refractive index smaller than that of the core region. And the core region is formed from the polymerizable composition. Since the core has a distribution in the refractive index, the optical member can exhibit a broad transmission band. Additionally, since the core region has a concentration distribution of the compound represented by the formula (1) or a distribution of the copolymerization ratio of the polymerizable monomer and the compound, thereby having the distribution in the refractive index, the core region has having slight loss of transmission light, slight increase of transmission light loss due to bending and high thermo-stability.

The optical member can be produced by a method comprising a first step of producing a hollow structure (for example a cylinder) corresponding to the clad region; a second step of producing a preform which comprises areas respectively corresponded to the core region and clad region by carrying out polymerization of a polymerizable composition in the hollow portion of the structure; and a third step of processing the obtained preform into various forms.

In the first step, a hollow structure (for example cylinder) made of a polymer is obtained. As typically described in International Patent Publication WO93/08488, a polymerizable monomer is put into a cylindrical polymerization vessel, and then polymerization is carried out while rotating (preferably while keeping the axis of the cylinder horizontally) the vessel (a polymerization carried out while rotating a vessel referred as "rotational polymerization" herein after) to thereby form a cylinder made of a polymer. Another material such as a polymerization initiator, a chain transfer agent and a stabilizer may be added to the monomer. How temperature and how long the polymerization is carried out may be decided selected in consideration of the monomer to be employed. In general, the polymerization is preferably carried out at 60 to 90° C. for 5 to 24 hours. The monomer used herein may be pre-polymerized before the polymerization so as to raise the viscosity thereof as described in JP-A No. hei 8-110419. Since the obtained hollow structure may be deformative when the vessel may get distorted by rotation, it is preferable to use a metal or glass vessel having a sufficient rigidity.

Examples of the monomer for the clad region include methacrylic esters such as methyl methacrylate, t-butyl methacrylate, cyclohexyl methacrylate, tricyclo[$5.2.1.0^{2,6}$] decanyl methacrylate, adamantyl methacrylate and i-bornyl methacrylate; and F-containing (meth)acrylic esters such as 2,2,2-trifluoroethyl methacrylate, 2,2,3,3-tetrafluoropropyl methacrylate, 2,2,3,3,3-pentafluoropropyl methacrylate, 1-trifluoromethyl-2,2,2-trifluoroethyl methacrylate, 2,2,3,3,4,4,5,5-octafluoropentyl methacrylate and 2,2,3,3,4,4-hexafluorobutyl methacrylate. When plural species of monomers are used, the ration of the species may be decided in consideration of the species.

A major component of the polymerizable monomer used for producing the clad region is preferably identical with that of the polymerizable monomer used for producing the core region, however, a minor component and a composition ratio for the clad region may be not identical with those for core region. Among them, both of the clad and core regions are preferably formed of copolymers of a methacrylic ester, a fluorinated methacrylic ester and, if desired, another polymerizable compounds.

The desirable additional amounts of the polymerization initiator and the chain transfer may be various according to what a kind used, however, in general, the desirable additional amount of the polymerization initiator may be in a range of 0.01 to 1.00 wt %, more desirably in a range of 0.40 to 0.60 wt %, of the monomer; and the desirable additional amount of the chain transfer agent may be in a range of 0.10 to 0.40 wt %, more desirably in a range of 0.15 to 0.30 wt %, of the monomer.

The cylinder corresponding to the clad region preferably has a bottom portion, so as that a material for the core region can be poured into the cylinder in the second step. The preferred material for the bottom portion is a material having a good affinity and adhesiveness with the polymer of the cylinder. The bottom portion may be formed of the same polymer as that of the cylinder. For example, the bottom potion can be produced by pouring a small amount of monomer into a vessel before or after carrying out rotational polymerization; and carrying out polymerization of the monomer with still standing the vessel.

For the purpose of completely reaction of the residual monomer or the residual polymerization initiator, it is allowable after such rotational polymerization to carry out annealing at a temperature higher than the polymerization temperature, or to remove non-polymerized components.

In the first step, it is also possible to produce the structure having a desired shape (cylindrical shape in this embodiment) by molding polymer using known molding technique such as extrusion molding.

In the second step, the polymerizable composition according to the present invention is poured into the hollow portion of the cylinder, which was obtained by the first step, corresponding to the clad region, and the polymerization of the monomer is carried out under heating. It is preferable from the view point of reducing residues to carry out the polymerization by a method based on the interfacial gel polymerization process which is solvent-free, disclosed in International Patent Publication No. WO93/08488. In the interfacial sol polymerization process, the polymerization of the polymerizable monomer proceeds along the radial direction of the cylinder from the inner wall thereof, of which viscosity is high, towards the center due to gel effect.

When the polymerizable monomer added with a refractive index adjusting agent is used in the polymerization, the polymerization proceeds in a way such that the monomer having a higher affinity to the polymer, of which the cylinder is made predominantly, exists in larger ratio on the inner wall of the cylinder and then polymerizes, so as to produce on the outer periphery a polymer having a lower content of the refractive index adjusting agent. Ratio of the refractive index adjusting agent in the resultant polymer increases towards the center. This successfully creates the distribution of refractive index adjusting agent and thus introduces the distribution of refractive index within the area corresponding to the core region.

For the case where the refractive index adjusting agent has a polymerizable group, the polymerizable monomers have different degrees of polymerization ability due to differential affinity to the polymer of the cylinder and differential diffusion (because of differences of intrinsic volumes and solubility parameters of the monomers) in a gel. Thus the monomer having a higher affinity to the polymer of which the cylinder is made predominantly segregates on the inner wall of the cylinder and then polymerizes, so as to produce a polymer having a higher content of such monomer. Ratio of the high-affinity monomer in the resultant polymer reduces towards the center. The distribution of refractive index can be created along the interface with the clad region to the center of the core region.

Not only the distribution of refractive index is induced into the area corresponding to the core region through the second step, but also the distribution of thermal behavior since the areas having different refractive indices are also different in the thermal behavior. If the polymerization in the second step is carried out at a constant temperature, the response property against the mass shrinkage which occurs in the polymerization reaction process may vary depending on the thermal behaviors, and thereby air bubbles or microgaps may generate in the obtained preform, and drawing under heating of such preform may result in that the obtained fiber has a lot of air bubbles formed therein. If the polymerization in the second step is carried out at too low temperature, the productivity may considerably lower due to low polymerization efficiency, or the light transmission performance of the resultant optical member may lower due to incomplete polymerization. On the contrary, if the polymerization in the second step is carried out at too high initial polymerization temperature, the initial polymerization rate may be so fast that the mass shrinkage of the core region cannot be reduced by a relaxation response, and as a result a lot of air bubbles may generate in the core region. Therefore, it is preferable to carry out the polymerization at a proper temperature for the used monomers. For the case where typical methacrylic esters are used as the monomer, the polymerization may be carried out at 50 to 150° C., preferably 80 to 120° C. It is also preferable to carry out the polymerization under inert gas atmosphere applied pressure in order to improve response property against the mass shrinkage which occurs in the polymerization. Using the polymerizable monomer dehydrated and deaerated under reduces pressure may prevent an occurrence of air bubbling during the polymerization.

Preferred range of polymerization temperature and polymerization period may vary according to species of the polymerizable monomer, however, in general, the polymerization is preferably carried out at 60 to 90° C. for 5 to 24 hours. It is also desirable to use a compound as a polymerization initiator, of which ten-hour, half-life decomposition temperature is equal to or higher than a boiling point of the monomers, and to carry out the polymerization in the presence of the initiator for a period which is equal to 25% of the initiator's half-life period. To carry out polymerization under the foregoing conditions can reduce the initial polymerization speed and can improve the response property against the mass shrinkage, which consequently reduces the introduction of air bubbles into the preform due to the mass shrinkage, and thus raises the productivity. It is to be noted now that ten-hour, half-life decomposition temperature of the polymerization initiator means a temperature at that the polymerization initiator decomposes and reduces to the half amount for ten hours.

For the case where methyl methacrylate (MMA) is used as the monomer, 2,2'-azobis(2-methylpropane) and 2,2'-azobis(2,4,4-trimethylpentane) can be selected as available ones from the above-listed polymerization initiators such that having a ten-hour, half-life decomposition temperature which is equal to or above the boiling point of the monomer. For the case where MMA is used as the monomer and the latter is used as the polymerization initiator, the polymerization is preferably allowed to proceed while keeping the initial polymerization temperature at 100 to 110° C. for 48 to 72 hours, and further allowed to proceed at a temperature elevated to 120 to 140° C. for 24 to 48 hours. For the case where the former is used as the polymerization initiator, the polymerization is preferably allowed to proceed while keeping the initial polymerization temperature at 100 to 110° C. for 4 to 24 hours, and further allowed to proceed at a temperature elevated to 120 to 140° C. for 24 to 48 hours. The temperature elevation may be effected either in a step-wise manner or in a continuous manner, where shorter time for the elevation is preferable.

In the second step, it is preferable to carry out the polymerization under pressure (herein after referred as "pressurized polymerization"). In case of the pressurized polymerization, it is preferable to place the cylinder in the hollow space of a jig, and to carry out the polymerization while keeping the cylinder as being supported by the jig. While the pressurized polymerization is being carried out in a hollow portion of the structure corresponding to the clad region, the structure is kept as being inserted in the hollow space of the jig, and the jig prevents the shape of the structure from being deformed due to pressure. The jig is preferably shaped as having a hollow space in which the structure can be inserted, and the hollow space preferably has a profile similar to that of the structure. Since the structure corresponding to the clad region is formed in a cylindrical form in the present embodiment, it is preferable that also the jig has a cylindrical form. The jig can suppress deformation of the cylinder during the pressurized polymerization, and supports the cylinder so as to relax the shrinkage of the area corresponding to the core region with the progress of the pressurized polymerization. It is preferable that the jig has a hollow space having a diameter larger than the outer diameter of the cylinder corresponding to the clad region, and that the jig supports the cylinder corresponding to the clad region in a non-adhered manner. Since the jig has a cylindrical form in the present embodiment, the inner diameter of the jig is preferably larger by 0.1 to 40% than the outer diameter of the cylinder corresponding to the clad region, and more preferably larger by 10 to 20%.

The cylinder corresponding to the clad region can be placed in a polymerization vessel while being inserted in the hollow space of the jig. In the polymerization vessel, it is preferable that the cylinder is housed so as to vertically align the height-wise direction thereof. After the cylinder is placed, while being supported by the jig, in the polymerization vessel, the polymerization vessel is pressurized. The pressurizing of the polymerization vessel is preferably carried out using an inert gas such as nitrogen, and thus the pressurized polymerization preferably is carried out under an inert gas atmosphere. While a preferable range of the pressure during the polymerization may vary with species of the monomer, it is generally 0.05 to 1.0 MPa or around.

A preform for the plastic optical member can be obtained through the first and second steps.

In the third step, a desired optical transmission member can be obtained by processing the preform produced through above steps. For example, slicing the preform gives plate-shaped or column-shaped planar lens, and drawing under fusion gives plastic optical fiber.

A plastic optical fiber can be obtained by drawing the preform under heating. While the heating temperature during the drawing may properly be determined in consideration of source material of the preform, a generally preferable range thereof is 180 to 250° C. Conditions for the drawing (drawing temperature, etc.) may properly be determined in consideration of diameter of the obtained preform, desirable diameter of the plastic optical fiber, and source materials used. For example, the drawing tension can be set to 10 g or above in order to orient molten plastic as described in JP-A No. hei 7-234322, and preferably set to 100 g or below so that strain does not remain after the spinning as disclosed in JP-A No. hei 7-234324. The preform may be pre-heated during drawing as disclosed in JP-A No. hei 8-106015. As for the fiber obtained by the foregoing method, bending property and lateral pressure property thereof can be improved by specifying break elongation and hardness of the obtained element fiber as described in JP-A No. hei 7-244220.

The plastic optical fiber after being processed in the third step can directly be subjected, without any modification, to various applications. The fiber may also be subjected to various applications in a form of having on the outer surface thereof a covering layer or fibrous layer, and/or in a form having a plurality of fibers bundled for the purpose of protection or reinforcement.

For the case where a coating is provided to the element wire, the covering process is such that running the element wire through a pair of opposing dies which has a through-hole for passing the element fiber, filling a molten polymer for the coating between the opposing dies, and moving the element fiber between the dies. The covering layer is preferably not fused with the element fiber in view of preventing the inner element fiber from being stressed by bending. In the covering process, the element fiber may be thermally damaged typically through contacting with the molten polymer. It is therefore preferable to set the moving speed of the element fiber so as to minimize the thermal damage, and to select a polymer for forming the covering layer which can be melted at a low temperature range. The thickness of the covering layer can be adjusted in consideration of fusing temperature of polymer for forming the covering layer, drawing speed of the element fiber, and cooling temperature of the covering layer.

Other known methods for forming the covering layer on the fiber include a method by which a monomer coated on the optical member is polymerized, a method of winding a sheet around, and a method of passing the optical member into a hollow pipe obtained by extrusion molding.

Coverage of the element fiber enables producing of plastic optical fiber cable. Styles of the coverage include contact coverage in which plastic optical fiber is covered with a cover material so that the boundary of the both comes into close contact over the entire circumference; and loose coverage having a gap at the boundary of the cover material and plastic optical fiber. The contact coverage is generally preferable since the loose coverage tends to allow water to enter into the gap from the end of the cover layer when a part of the cover layer is peeled off typically at the coupling region with a connector, and to diffuse along the longitudinal direction thereof. The loose coverage in which the coverage and element fiber are not brought into close contact, however, is preferably used in some purposes since the cover layer can relieve most of damages such as stress or heat applied to the cable, and can thus reduce damages given on the element fiber. The diffusion of water from the end plane is avoidable by filling the gap with a fluid gel-form, semi-solid or powdery material. The coverage with higher performance will be obtained if the semi-solid or powdery material is provided with functions other than water diffusion preventive function, such as those improving heat resistance, mechanical properties and the like.

The loose coverage can be obtained by adjusting position of a head nipple of a crosshead die, and by controlling a decompression device so as to form the gap layer. The thickness of the gap layer can be adjusted by controlling the thickness of the nipple, or compressing/decompressing the gap layer.

It is further allowable to provide another cover layer (secondary cover layer) so as to surround the existing cover layer (primary cover layer). The secondary cover layer may be added with flame retarder, UV absorber, antioxidant, radical trapping agent, lubricant and so forth, which may be included also in the primary cover layer so far as a satisfactory level of the anti-moisture-permeability is ensured.

While there are known resins or additives containing bromine or other halogen or phosphorus as the flame retarder, those containing metal hydroxide are becoming a mainstream from the viewpoint of safety such as reduction in emission of toxic gas. The metal hydroxide has crystal water in the structure thereof and this makes it impossible to completely remove the adhered water in the production process, so that the flame-retardant coverage is preferably provided as an outer cover layer (secondary cover layer) surrounding the anti-moisture-permeability layer (primary cover layer) of the present invention.

It is still also allowable to stack cover layers having a plurality of functions. For example, besides flame retardation, it is allowable to provide a barrier layer for blocking moisture absorption by the element fiber or moisture absorbent for removing water, which is typified by hygroscopic tape or hygroscopic gel, within or between the cover layers. It is still also allowable to provide a flexible material layer for releasing stress under bending, a buffer material such as foaming layer, and a reinforcing layer for raising rigidity, all of which may be selected by purposes. Besides resin, a highly-elastic fiber (so-called tensile strength fiber) and/or a wire material such as highly-rigid metal wire are preferably added as a structural material to a thermoplastic resin, which reinforces the mechanical strength of the obtained cable.

Examples of the tensile strength fiber include aramid fiber, polyester fiber and polyamide fiber. Examples of the metal wire include stainless wire, zinc alloy wire and copper wire. Both of which are by no means limited to those described in the above. Any other protective armor such as metal tube, subsidiary wire for aerial cabling, and mechanisms for improving workability during wiring can be incorporated.

Types of the cable include collective cable having element fibers concentrically bundled; so-called tape conductor having element fibers linearly aligned therein; and collective cable further bundling them by press winding or wrapping sheath; all which can properly be selected depending on applications.

The optical member of the present invention is available as an optical fiber cable for use in a system for transmitting light signal, which system comprises various light-emitting element, light-receiving element, other optical fiber, optical bus, optical star coupler, light signal processing device, optical connector for connection and so forth. Any known technologies may be applicable while making reference to "Purasuchikku Oputicaru Faiba no Kiso to Jissai (Basics and Practice of Plastic Optical Fiber)", published by N.T.S. Co., Ltd.; optical bus typically described in JP-A Nos. hei 10-123350, 2002-90571 and 2001-290055; optical branching/coupling device typically described in JP-A Nos. 2001-74971, 2000-329962, 2001-74966, 2001-74968, 2001-318263 and 2001-311840; optical star coupler typically described in JP-A No. 2000-241655; light signal transmission device and optical data bus system typically described in JP-A Nos. 2002-62457, 2002-101044 and 2001-305395; light signal processor typically described in JP-A No. 2002-23011; light signal cross-connection system typically described in JP-A No. 2001-86537; optical transmission system typically described in JP-A No. 2002-26815; and multi-function system typically described in JP-A Nos. 2001-339554 and 2001-339555.

EXAMPLES

The present invention will specifically be described referring to the specific examples. It is to be noted that any materials, reagents, ratio of use, operations and so forth can properly be altered without departing from the spirit of the present invention. The scope of the present invention is therefore by no means limited to the specific examples shown below.

[Preparation of Compound 1–43]

100 mmol of 1,3-diiodebenzene and 30 mmol of p-toluene thiol were dissolved in 90 ml of toluene and subsequently 300 mmol of 1,8-diazobicyclo[5,4,0]-7-undecene (DBU) and 60 mmol of copper (I) bromide were added to the solution and the solution refluxed under a nitrogen atmosphere for 6 hours. After cooled down by room temperature, a saturated solution of ammonium chloride was added to the solution and the solution was extracted from with ethyl acetate. The ethyl acetate extraction was washed with 1 mol/l of sodium hydrate solution and subsequently with a saturated sodium chloride solution and dried over magnesium sulfate. Ethyl acetate was evaporated under reduced pressure, ethanol was added to the residue. Compound 1–43 was obtained in a 57.7% yield by recrystallization of the ethanol solution.

Determination was performed by measuring $^1$H-NMR and MS. The obtained Compound 1–43 had a refractive index of 1.659.

[Preparation of Compound 1–53]

15.15 mmol of 2-diiodo-benzene and 45.45 mmol of 2-bromobenzenethiol were dissolved in 25 ml of toluene. Subsequently 45.45 mmol of 1,8-diazobicyclo-[5,4,0]-7-undecene (DBU) and 9.09 mmol of copper (I) bromide were added to the solution and the solution was refluxed under a nitrogen atmosphere for 6 hours. After cooled down by room temperature, a saturated solution of ammonlum chloride was added to the solution and the solution was extracted with ethyl acetate. The ethyl acetate extract was washed with 1 mol/l of sodium hydroxide solution and subsequently with a saturated sodium chloride solution and dried over magnesium sulfate. Ethyl acetate was evaporated under reduced pressure, the residue was purified by a silica gel column with an eluent of a mixed solution of hexane and ethyl acetate (v/v =30/1)). Ethanol was added to the residue and Compound 1–43 was obtained in a 70.1% yield by recrystallization of the ethanol solution.

The obtained compound was identified by measuring $^1$H-NMR and MS. Compound 1–43 had a refractive index of 1.700.

Various compounds represented by the formula (1), having another substituents as $R^1$ to $R^3$, can be prepared in the same manner as above preparation methods.

Example 1

Production of Optical Fiber (Production of Clad Region)

A mixture of methyl methacrylate (MMA), removed hydroquinone monomethyl ether known as a polymerization inhibitor and reduced water content by 80 ppm or less, 50 wt % (with respect to MMA weight) of benzoyl peroxide (BPO) as a polymerization initiator and 0.28 wt % (with respect to MMA weight) of n-laurylmercaptan as a chain transfer agent, were poured into a sufficiently-rigid cylindrical vessel having 22 mm in inner diameter and 600 mm in length, which inner diameter corresponds with the outer diameter of the preform to be obtained. The vessel was placed in the water bath at 80° C. and the mixture was shaken and pre-polymerized at 80° C. for 2 hours. Subsequently, the mixture was allowed to polymerize under heating at 80° C. for three hours while holding the vessel horizontally and rotating it at a speed of rotation of 3,000 rpm, which was followed by annealing at 100° C. for 24 hours to thereby obtain hollow cylinder made of the polymethyl methacrylate (PMMA).

(Production of Core Region)

Next, a mixed solution of MMA, removed hydroquinone monomethyl ether known as a polymerization inhibitor and reduced water content by 80 ppm or less, and 20 wt % (with respect to MMA weight) of Compound 1–19 as a dopant was prepared. The mixed solution was directly poured into the hollow region of the obtained hollow cylinder while being filtered through a membrane filter, based on tetrafluoroethylene, having a pore size of 0.2 μm. 0.016 wt % (with respect to MMA weight) of BPO as a polymerization initiator and 0.27 wt % (with respect to MMA weight) of n-laurylmercaptan as a chain transfer agent (a chain transfer constant in this polymerization system is 0.8) were added to the mixed solution. A cylinder thus filled with the monomer and so forth was housed in a glass tube having a diameter larger by 9% than the outer diameter of the cylinder, and was then allowed to stand vertically in a pressure polymerization reactor. The inner atmosphere of the pressure polymerization reactor was then purged with nitrogen, pressurized up to 0.6 MPa, and the heat polymerization was allowed to proceed at 100° C. for 48 hours and subsequently 120° C. for 24 hours with keeping the pressured atmosphere to thereby obtain the preform.

The obtained preform observed when the polymerization completed was found to have no air bubbles contained therein which possibly introduced by mass shrinkage. The preform was drawn by thermal drawing at 230° C. so as to produce a plastic optical fiber having a diameter of approx.

700 to 800 μm. The preform was not found to include air bubbles during the drawing, which contributed to successfully obtain the fiber of 300 m long in a stable manner.

The core region of the fiber had a Tg of 90° C.

Measurements revealed that the obtained fiber had a light transmission loss of as small as 172 dB/km. A bending test was performed for the obtained fiber according to the method disclosed in JP-A No.hei 7-244220, thereby finding a value (dB) of transmission light loss due to bending of the fiber. Specifically, the value of light transmission loss of the fiber was measured while the fiber was wrapped by 90° around a mandrel having a 500 mm diameter, and the increase of light transmission loss due to bending was found. A maximum value of the increase was defined as a value of light transmission loss due to bending. The value of light transmission loss due to bending of the fiber was found 0.08 dB.

Examples 2 to 12

Various fibers of Examples 2 to 12 were produced in the same manner as Example 1, except that the species or the amounts of monomers, polymerization initiators, chain transfer agents or dopants for the clad region or the core region were respectively changed as shown in Table 1 below.

The obtained fibers were respectively measured the values of Tg of the core regions, the values of transmission light loss and the values of transmission light loss due to bending in the same manner as Example 1. The results were shown in Table 2 below.

[Comparative Examples 1 and 2]

Fibers of Comparative Examples 1 and 2 were produced in the same manner as Example 1, except that the species or the amounts of monomers, polymerization initiators, chain transfer agents or dopants for the clad region or the core region were respectively changed as shown in Table 1 below.

The obtained fibers were respectively measured the values of Tg of the core regions, the values of transmission light loss and the values of transmission light loss due to bending in the same manner as Example 1. The results were shown in Table 2 below.

TABLE 1

|  | Clad Region | | | Core Region | | | |
| --- | --- | --- | --- | --- | --- | --- | --- |
|  | Monomer (wt %) | Polymerization Initiator | Chain Transfer Agent | Monomer (wt %) | Polymerization Initiator | Chain Transfer Agent | Dopant |
| Example 1 | Monomer 1 (100) | A | n-LM | Monomer 1(100) | B | n-LM | (1–19) |
| Example 2 | Monomer 1 (100) | A | n-LM | Monomer 1(100) | B | n-LM | (1–43) |
| Example 3 | Monomer 1 (100) | A | n-LM | Monomer 1(100) | B | n-LM | (1–45) |
| Example 4 | Monomer 1 (100) | A | n-LM | Monomer 1(100) | B | n-LM | (1–53) |
| Example 5 | Monomer 1 (100) | A | n-LM | Monomer 1(100) (1–28) (20) | B | n-LM | see Monomer column |
| Example 6 | Monomer 1 (100) | A | n-LM | Monomer 1(100) (1–30) (20) | B | n-LM | see Monomer column |
| Example 7 | Monomer 1(70) Monomer 2(30) | A | n-LM | Monomer 1(90) Monomer 2(10) | B | n-LM | (1–8) |
| Example 8 | Monomer 1(40) Monomer 2(30) Monomer 4(30) | A | n-LM | Monomer 1(90) Monomer 2(10) | B | n-LM | (1–18) |
| Example 9 | Monomer 1(50) Monomer 3(25) Monomer 4(25) | A | n-LM | Monomer 1(80) Monomer 3(10) Monomer 4(10) | B | n-LM | (1–46) |
| Example 10 | Monomer 1(60) Monomer 2(20) Monomer 4(20) | A | n-LM | Monomer 1(80) Monomer 2(10) Monomer 4(10) | B | n-LM | (1–50) |
| Example 11 | Monomer 1(50) Monomer 3(25) Monomer 4(25) | A | n-LM | Monomer 1(85) Monomer 2(15) (1–28) (20) | B | n-LM | see Monomer column |
| Example 12 | Monomer 1(50) Monomer 3(25) Monomer 4(25) | A | n-LM | Monomer 1(90) Monomer 3(10) (1–30) (20) | B | n-LM | see Monomer column |
| Comparative Example 1 | Monomer 1 (100) | A | n-LM | Monomer 1(100) | B | n-LM | BB |
| Comparative Example 2 | Monomer 1 (100) | A | n-LM | Monomer 1(100) | B | n-LM | BEN |

In the Table 1, the terms mean respectively as follows:
Monomer 1: Methyl methacrylate,
Monomer 2: 2,2,2-trifluoroethyl methacrylate,
Monomer 3: 1,1,1,3,3,3-hexafluoro-2-propyl methacrylate,
Monomer 4: tricyclodecyl methacrylate,
A: Benzoyl peroxide,
B: di-t-butyl peroxide,
n-LM: n-laurylmercaptan,
BB: bromobenzene
BEN: benzyl benzoate.

TABLE 2

| | Core Region Tg (° C.) | Light Transmission loss due to Bending(dB) | Light Transmission Loss (dB/km) |
|---|---|---|---|
| Example 1 | 90° C. | 0.08 | 172 |
| Example 2 | 92° C. | 0.07 | 162 |
| Example 3 | 89° C. | 0.06 | 170 |
| Example 4 | 91° C. | 0.08 | 171 |
| Example 5 | 114° C. | 0.08 | 165 |
| Example 6 | 120° C. | 0.07 | 170 |
| Example 7 | 91° C. | 0.07 | 165 |
| Example 8 | 93° C. | 0.08 | 173 |
| Example 9 | 90° C. | 0.08 | 170 |
| Example 10 | 88° C. | 0.06 | 167 |
| Example 11 | 103° C. | 0.08 | 164 |
| Example 12 | 112° C. | 0.08 | 167 |
| Comparative Example 1 | 72° C. | 0.18 | 183 |
| Comparative Example 2 | 68° C. | 0.20 | 188 |

According to the present invention, it is possible to provide polymerizable compositions capable of producing optical members having slight loss of transmission light, slight increase of transmission light loss due to bending and high thermo-stability. It is also possible to provide optical members having slight loss of transmission light, slight increase of transmission light loss due to bending and high thermo-stability. It is also possible to provide novel S-containing compounds useful as an agent for adjusting refractive index.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An optical member comprising a region having a distribution in the refractive index, formed by polymerization of a composition comprising a polymerizable monomer and a compound represented by formula (1) below having a refractive index differing from that of the polymerizable monomer:

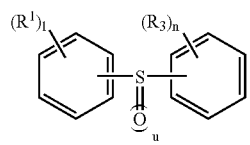

Formula (1)

where $R^1$ and $R^3$ independently denote a C1–12 atkyl group, a C3–6 cycloalkyl group, a halogen atom, $CH_2=CH-$, $CH_2=CH-O-$, $CH_2CH-C(=O)-O-$, $CH_2=C(CH_3)-C(=O)O-$, $R^{4'}-C(=O)O-$, $R^{4'}-C(=S)O-$, $R^{4'}-C(=O)-$ or $R^{4'}-O-$ where $R^4$ denotes a C1–9 alkyl group, provided that at most a single one of the collective plural $R^1$ and plural $R^3$ groups represents a polymerizable group selected from the group consisting of $CH_2CH-$, $CH_2=CH-O-$, $CH_2=CH-C(=O)-O-$, and $CH_2=C(CH_3)-C(=O)O-$; l and n are respectively integers of 0 to 5, provided that at least one of l and n is not 0; and u is an integer of 0 to 2.

2. The optical member of claim 1, wherein the region is formed by an interfacial gel polymerization of the composition.

3. The optical member of claim 1, wherein the region has a concentration distribution of the compound or a distribution of the copolymerization ratio of the polymerizable monomer and the compound, thereby having the distribution in the refractive index.

4. The optical member of claim 1, wherein refractive index in the region is distributed along with the direction from the center to the outside in cross section thereof.

5. The optical member of claim 1, comprising a core region and a clad region cladding the core region and having different refractive index from that of the core region, wherein the core region has a distribution in the refractive index and is formed by polymerization of the composition.

6. The optical member of claim 1, wherein the polymerizable monomer comprises an ester of propenoic acid or derivatives thereof as a major component.

7. The optical member of claim 1, wherein the polymerizable monomer comprises an ester of (meth)acrylic acid or derivatives thereof as a major component.

8. The optical member of claim 1, wherein the polymerizable monomer comprises a compound having a halogen atom and at least one of $R^1$, $R^2$ and $R^3$ contains a halogen atom.

9. The optical member of claim 1, wherein the polymerizable monomer comprises a compound having a fluorine atom and at least one of $R^1$, $R^2$ and $R^3$ contains a fluorine atom.

10. The optical member of claim 1 used as an optical fiber, light guide member or optical lens.

* * * * *